(12) United States Patent
Choi

(10) Patent No.: US 11,153,491 B2
(45) Date of Patent: Oct. 19, 2021

(54) ELECTRONIC DEVICE AND METHOD FOR OPERATING SAME

(71) Applicant: SAMSUNG ELECTRONICS CO., LTD., Suwon-si (KR)

(72) Inventor: Jaehyuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/954,005

(22) PCT Filed: Dec. 17, 2018

(86) PCT No.: PCT/KR2018/016028
§ 371 (c)(1),
(2) Date: Jun. 15, 2020

(87) PCT Pub. No.: WO2019/124910
PCT Pub. Date: Jun. 27, 2019

(65) Prior Publication Data
US 2021/0084234 A1 Mar. 18, 2021

(30) Foreign Application Priority Data
Dec. 18, 2017 (KR) .......................... 10-2017-0174429

(51) Int. Cl.
*H04N 5/232* (2006.01)
*H04N 5/77* (2006.01)

(52) U.S. Cl.
CPC ... *H04N 5/232945* (2018.08); *H04N 5/23222* (2013.01); *H04N 5/77* (2013.01)

(58) Field of Classification Search
CPC ......... H04N 5/232945; H04N 5/23222; H04N 5/77; H04N 5/23293; H04N 5/23229;
(Continued)

(56) References Cited

U.S. PATENT DOCUMENTS 9,241,191 B2 * 1/2016 Shim .................. H04N 21/4312
10,120,635 B2 * 11/2018 Yoganandan ......... G06F 3/0482
(Continued)

FOREIGN PATENT DOCUMENTS

| CN | 102124730 A | 7/2011 |
| CN | 103797511 A | 5/2014 |

(Continued)

OTHER PUBLICATIONS

Communication dated Oct. 1, 2020 issued by the European Intellectual Property Office in European Application No. 18890453.6.
(Continued)

*Primary Examiner* — Pritham D Prabhakher
(74) *Attorney, Agent, or Firm* — Sughrue Mion, PLLC

(57) ABSTRACT

The electronic device according to an embodiment includes: a camera; a display; a memory storing one or more instructions; and a processor configured to execute the one or more instructions stored in the memory to: determine a size of a wall surface to be photographed to be output to an image display apparatus; control the display to display, on a preview image, a guideline indicating a region corresponding to the size of the wall surface to be photographed, based on a distance between the electronic device and the wall surface; control the camera to capture an image indicating the wall surface, based on the output guideline; and transmit the captured image to the image display apparatus such that the captured image is output to the image display apparatus.

15 Claims, 16 Drawing Sheets

(58) Field of Classification Search
CPC ....... H04N 19/70; G06F 3/011; G06F 3/1446; G06F 3/1438; G06F 3/1454; G06F 3/0482; G06F 3/04845; G06F 3/1462; G06F 3/1423; G06F 3/147; G06T 2210/22; G06T 3/40; G06T 11/40; G06T 11/001; G06T 7/90; G06T 2207/20024; G06T 19/006; G09G 5/14; G09G 5/377; G09G 2370/02; G09G 2370/16; G09G 2370/06; G09G 2370/042; G09G 2380/16; G02B 27/0172; G02B 2027/0178; G02B 2027/0198; G02B 2027/0138; G02B 2027/014
USPC ...................................................... 348/222.1
See application file for complete search history.

(56) References Cited

U.S. PATENT DOCUMENTS

| | | | | |
|---|---|---|---|---|
| 10,122,969 | B1* | 11/2018 | Lim | G06T 7/11 |
| 10,378,877 | B2* | 8/2019 | Nagano | G06T 7/74 |
| 10,735,820 | B2* | 8/2020 | Kim | H04N 21/485 |
| 2002/0052709 | A1* | 5/2002 | Akatsuka | G01C 11/02 |
| | | | | 702/153 |
| 2008/0240550 | A1* | 10/2008 | Morita | G06T 7/70 |
| | | | | 382/154 |
| 2012/0013646 | A1 | 1/2012 | Ichioka et al. | |
| 2012/0176544 | A1* | 7/2012 | Shim | H04N 21/44222 |
| | | | | 348/565 |
| 2014/0232625 | A1* | 8/2014 | Murase | G09G 3/2003 |
| | | | | 345/89 |
| 2014/0307084 | A1 | 10/2014 | Zontrop et al. | |
| 2014/0313117 | A1* | 10/2014 | Addy | G06F 3/048 |
| | | | | 345/156 |
| 2015/0145887 | A1 | 5/2015 | Forutanpour et al. | |
| 2015/0260505 | A1* | 9/2015 | Nagano | G06T 7/73 |
| | | | | 348/135 |
| 2016/0119553 | A1* | 4/2016 | Alm | G06K 9/3241 |
| | | | | 348/143 |
| 2017/0068501 | A1 | 3/2017 | Choe et al. | |
| 2017/0262247 | A1 | 9/2017 | Yoganandan et al. | |
| 2018/0103299 | A1* | 4/2018 | Kim | G06T 7/194 |
| 2018/0174555 | A1* | 6/2018 | Lee | G09G 5/377 |
| 2018/0300770 | A1* | 10/2018 | Kamel | G06Q 30/0276 |

FOREIGN PATENT DOCUMENTS

| | | |
|---|---|---|
| CN | 106506792 A | 3/2017 |
| EP | 2 570 986 A1 | 3/2013 |
| EP | 3 337 161 A1 | 6/2018 |
| JP | 2006-333301 A | 12/2006 |
| JP | 2016-189124 A | 11/2016 |
| KR | 10-2012-0063987 A | 6/2012 |
| KR | 10-2013-0006878 A | 1/2013 |
| KR | 10-2014-0060365 A | 5/2014 |
| KR | 10-1454827 B1 | 10/2014 |
| KR | 10-1734372 B1 | 5/2017 |
| KR | 10-1764433 B1 | 8/2017 |
| WO | 2017/078356 A1 | 5/2017 |

OTHER PUBLICATIONS

International Search Report (PCT/ISA/210) and Written Opinion (PCT/ISA/237) dated Apr. 2, 2019 issued by the International Searching Authority in International Application No. PCT/KR2018/016028.

Communication dated Mar. 11, 2021, issued by the China National Intellectual Property Administration in Chinese Application No. 201880081618.1.

* cited by examiner

ELECTRONIC DEVICE AND METHOD FOR OPERATING SAME

TECHNICAL FIELD

Various embodiments relate to an electronic device and an operating method of the same, and more particularly, to an electronic device for capturing an image to be output to an external device, and an operating method of the electronic device.

BACKGROUND ART

An image display apparatus is an apparatus having a function of displaying an image viewable by a user. The user may view a broadcast via the image display apparatus. The image display apparatus displays, on a display, a broadcast selected by the user among broadcast signals transmitted from a broadcasting station. Currently, broadcasting is shifting from analog broadcasting to digital broadcasting worldwide.

Digital broadcasting denotes broadcasting in which digital images and audio signals are transmitted. Compared to analog broadcasting, digital broadcasting is more resistant to external noise, and thus there is little data loss, is advantageous in error correction, has high resolution, and provides a clear screen. Also, unlike analog broadcasting, digital broadcasting can provide a bidirectional service.

Furthermore, recently, smart televisions (TVs) providing various types of content in addition to a digital broadcasting function have been provided. A smart TV does not operate manually according to the user's selection, but aims at analyzing and providing what the user wants without the user's operation.

In addition, recently, a technology for using an image display apparatus as a picture frame has been proposed.

DESCRIPTION OF EMBODIMENTS

Technical Problem

Various embodiments are for further efficiently capturing an image indicating a wall surface so as to output the image indicating the wall surface as a background image of an image display apparatus.

Solution to Problem

An electronic device according to an embodiment includes: a camera; a display; a memory storing one or more instructions; and a processor configured to execute the one or more instructions stored in the memory to: determine a size of a wall surface to be photographed to be output to an image display apparatus; control the display to display, on a preview image, a guideline indicating a region corresponding to the size of the wall surface to be photographed, based on a distance between the electronic device and the wall surface; control the camera to capture an image indicating the wall surface, based on the guideline; and transmit the captured image to the image display apparatus such that the captured image is output to the image display apparatus.

Advantageous Effects of Disclosure

According to various embodiments, a user can freely and accurately capture an image by showing a range to be captured by using a distance between an apparatus and a wall.

BEST MODE

Figure 1:
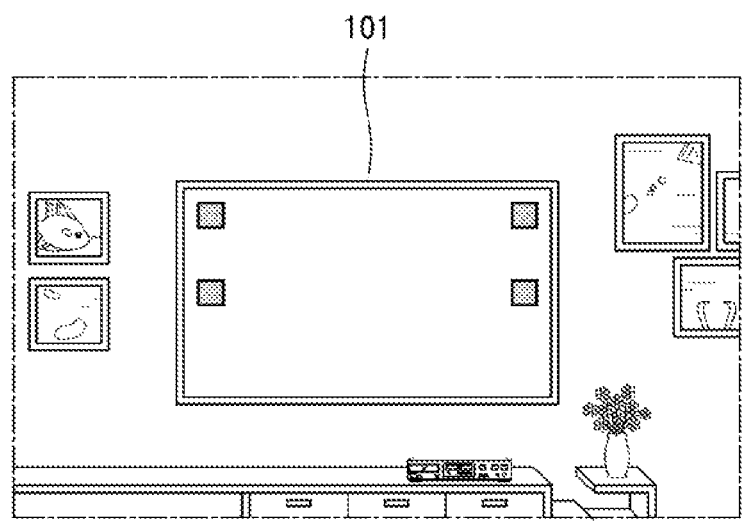
FIG. 1 is a diagram showing an electronic device according to an embodiment.
Figure 1:
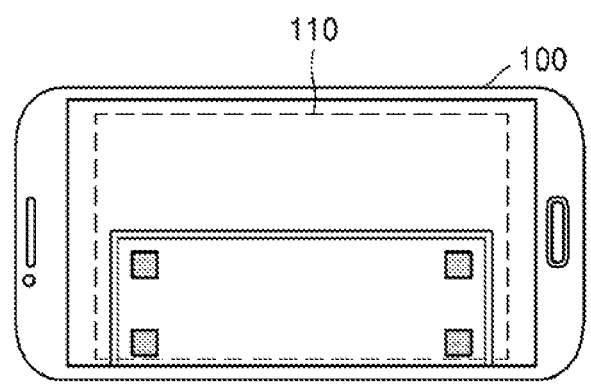

An electronic device according to an embodiment includes: a camera; a display; a memory storing one or more instructions; and a processor configured to execute the one or more instructions stored in the memory to: determine a size of a wall surface to be photographed to be output to an image display apparatus; control the display to display, on a preview image, a guideline indicating a region corresponding to the size of the wall surface to be photographed, based on a distance between the electronic device and the wall surface; control the camera to capture an image indicating the wall surface, based on the guideline; and transmit the captured image to the image display apparatus such that the captured image is output to the image display apparatus.

The processor may be further configured to execute the one or more instructions to determine the size of the wall surface to be photographed, based on a marker output to the image display apparatus to indicate a distance between the electronic device and the image display apparatus and a photographing region.

The processor may be further configured to execute the one or more instructions to: calculate a size of a region determined by the marker, based on the distance between the electronic device and the image display apparatus; and determine the size of the region determined by the marker as the size of the wall surface to be photographed.

The processor may be further configured to execute the one or more instructions to: in response to movement of the electronic device being detected, calculate a distance between the electronic device and the wall surface; adjust a size of the guideline, based on the calculated distance between the electronic device and the wall surface; and control the display to display, on the preview image, the guideline of which the size is adjusted.

The processor may be further configured to execute the one or more instructions to: in response to the distance between the electronic device and the wall surface being decreased based on the movement of the electronic device, adjust the size of the guideline to be larger; and adjust the size of the guideline to be smaller when the distance between the electronic device and the wall surface is increased according to the movement of the electronic device.

The processor may be further configured to execute the one or more instructions to: receive information about a size of a screen of the image display apparatus from the image display apparatus; and determine the size of the wall surface to be photographed, based on the received information.

The processor may be further configured to execute the one or more instructions to: perform at least one of size correction, color correction, brightness correction, and distortion correction on the captured image; and transmit the corrected image to the image display apparatus such that the corrected image is output to the image display apparatus.

The processor may be further configured to execute the one or more instructions to, in response to an external input of touching a region of the preview image, move the guideline to the touched region.

The processor may be further configured to execute the one or more instructions to: extract a region indicated by the guideline from the captured image and storing the region; and transmit the stored image to the image display apparatus such that the stored image is output to the image display apparatus.

The processor may be further configured to execute the one or more instructions to calculate the distance between the electronic device and the wall surface based on at least one of an ultrasonic sensor and a gyro sensor.

An operating method of an electronic device according to an embodiment includes: determining a size of a wall surface to be photographed to be output to an image display apparatus; displaying, on a preview image, a guideline indicating a region corresponding to the size of the wall surface to be photographed, based on a distance between the electronic device and the wall surface; capturing an image indicating the wall surface, based on the guideline; and transmitting the captured image to the image display apparatus such that the captured image is output to the image display apparatus.

MODE OF DISCLOSURE

Hereinafter, embodiments of the present disclosure will be described in detail with reference to the accompanying drawings such that one of ordinary skill in the art may easily implement the present disclosure. However, the present disclosure may be implemented in various different forms and is not limited to the embodiments of the disclosure described herein. Also, in the drawings, parts irrelevant to the description are omitted in order to clearly describe the present disclosure, and like reference numerals designate like elements throughout the specification.

Terms used in the present disclosure are described as general terms currently used in consideration of functions described in the present disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

Also, the terms used in the present disclosure are only used to describe specific embodiments, and are not intended to limit the present disclosure. An expression used in the singular encompasses the expression in the plural, unless it has a clearly different meaning in the context. Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

"The" and similar directives used in the present specification, in particular, in claims, may indicate both singular and plural. Also, unless there is a clear description of an order of operations describing a method according to the present disclosure, the operations described may be performed in a suitable order. The present disclosure is not limited by the order of description of the described operations.

The phrases "some embodiments" or "an embodiment" appearing in various places in this specification are not necessarily all referring to the same embodiment.

Some embodiments of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the present disclosure may be implemented in various programming or scripting languages. The functional blocks may be implemented by algorithms executed in one or more processors. In addition, the present disclosure may employ conventional techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the disclosure will be described in detail with reference to accompanying drawings.

FIG. 1 is a diagram showing an electronic device according to an embodiment.

An electronic device 100 may be implemented in various forms. For example, the electronic device 100 may be a mobile phone, a smart phone, a personal computer (PC), a tablet PC, a personal digital assistant (PDA), a laptop computer, a media player, an MP3 player, a portable multimedia player (PMP), a digital camera, a navigation device, a global positioning system (GPS) device, an electronic book terminal, a digital broadcasting terminal, a micro-server, or another mobile or non-mobile computing device, but is not limited thereto. Also, the electronic device 100 may be a wearable device, such as a watch, glasses, a hair band, or a ring, having a communication function and a data processing function.

Also, an image display apparatus 101 according to an embodiment may be a television (TV), but is not limited thereto and may be implemented as an apparatus including a memory and a processor. For example, the electronic device 100 may be implemented as various electronic devices such as a mobile phone, a tablet PC, a digital camera, a camcorder, a laptop computer, a desktop computer, an electronic book terminal, a digital broadcasting terminal, a PDA, a PMP, a navigation device, an MP3 player, and a wearable device. Also, the image display apparatus 101 may be a fixed type or a movable type, and may be a digital broadcasting receiver capable of receiving a digital broadcast.

Also, the image display apparatus 101 according to an embodiment may be implemented as an apparatus further including a display. The image display apparatus 101 may be implemented as not only a flat display apparatus, but also a curved display apparatus with a screen having a curvature or a flexible display apparatus with an adjustable curvature. Output definition of the image display apparatus 101 may include, for example, high definition (HD), full HD, ultra HD, or definition clearer than ultra HD.

The image display apparatus 101 according to an embodiment may output moving image content, such as a broadcast program or a movie. Also, the image display apparatus 101 may output an execution screen of an application or widget operable in the image display apparatus 101 or may be used as a picture frame by outputting an image such as a picture or a painting. When the image display apparatus 101 is used as a picture frame or outputs an execution screen of an application or widget, the image display apparatus 101 may output an image indicating a wall surface located around the image display apparatus 101 as a background screen of the image display apparatus 101. For example, when a wallpaper of a stripe pattern is attached to a wall surface where the image display apparatus 101 is hung, the image display apparatus 101 may output, as the background screen, an image obtained by capturing the wall surface to which the wallpaper of the stripe pattern is attached. Hereinafter, for convenience of description, an image indicating a wall surface or an image obtained by capturing a wall surface will be referred to as a wall surface image.

The image display apparatus 101 may output a picture or a painting or output an execution screen of an application or widget on the wall surface image. Accordingly, when the image display apparatus 101 is used as a picture frame or when the image display apparatus 101 outputs the execution screen of the application or widget, a sense of difference from an actual wall surface around the image display apparatus 101 may be reduced.

To obtain the above objective, a user may capture the wall surface image by using the electronic device 100 and transmit the captured wall surface image to the image display apparatus 101 such that the captured wall surface image is output to the image display apparatus 101. When the wall surface image captured by the electronic device 100 is output to the image display apparatus 101, the sense of difference from the actual wall surface may need to be minimized.

The electronic device 100 according to an embodiment may photograph a wall surface of the same size as a screen of the image display apparatus 101 where the wall surface image is to be output such that the wall surface image captured by the electronic device 100 and the actual wall surface have patterns of the same size and the sense of difference between the captured wall surface image and the actual wall surface is reduced. For example, the electronic device 100 may photograph the wall surface of the size corresponding to ½ of the size of the screen of the image display apparatus 101. Then, the electronic device 100 may output the captured wall surface image to a region corresponding to ½ of the screen of the image display apparatus 101 and output the same wall surface image to a region corresponding to remaining ½ of the screen. Here, the image display apparatus 101 may output a marker indicating a region to be photographed by the electronic device 100 such that the user easily determines the size of the wall surface to be photographed. For example, referring to FIG. 1, the image display apparatus 101 may output the marker to each of four corners of the region corresponding to ½ of the screen of the image display apparatus 101. As shown in FIG. 1, the marker may indicate one of two regions obtained by horizontally dividing the screen of the image display apparatus 101 in two. Also, according to an embodiment, the marker may indicate one of two regions obtained by vertically dividing the screen of the image display apparatus 101 in two, but is not limited thereto.

The electronic device 100 according to an embodiment may capture an image of the marker output to the image display apparatus 101 and the wall surface image including the wall surface having the same size as the size of the region determined by the marker. Here, the electronic device 100 may display, on a preview image, a guideline including the marker output to the image display apparatus 101 and including the wall surface having the same size as the size of the region determined by the marker. The electronic device 100 may display the guideline on the preview image such that the user easily determines the size of the wall surface to be photographed.

However, when the electronic device 100 has to photograph a region including the marker, a range of the wall surface capable of being photographed may be too narrow. For example, it may be difficult to photograph a wall surface suitable to be output to the image display apparatus 101 when the wall surface around the image display apparatus 101 is contaminated and/or damaged, when an obstacle (for example, furniture such as a picture frame a bookshelf) is present at the wall surface around the image display apparatus 101, or when a distance between the electronic device 100 and the image display apparatus 101 is short. For example, when the wall surface image including an image indicating the contaminated or damaged wall surface or including the obstacle is output to the image display apparatus 101, the sense of difference between the wall surface image output to the image display apparatus 101 and the actual wall surface may be relatively large. Accordingly, when the electronic device 100 captures the wall surface image, a method of easily photographing a wall surface suitable to be output to the image display apparatus 101 or a wall surface desired by the user is required.

Figure 2:
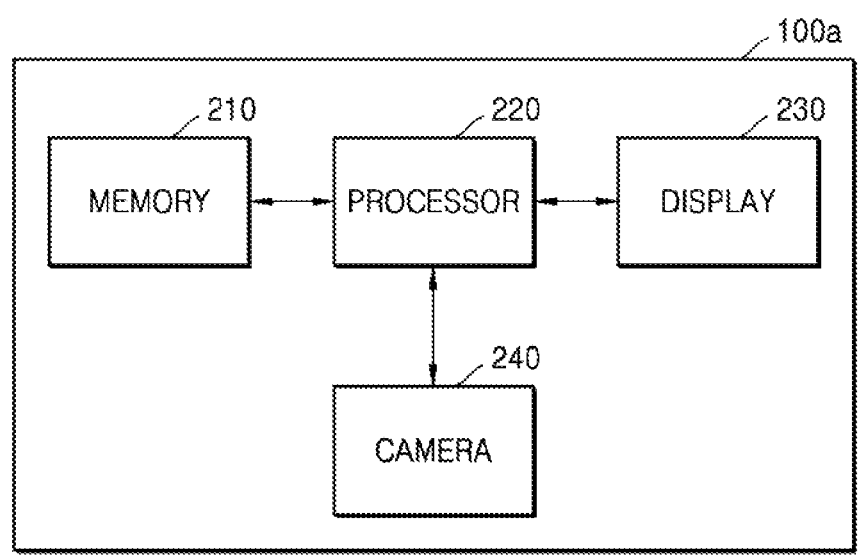
FIG. 2 is a block diagram showing a configuration of an electronic device, according to an embodiment.

FIG. 2 is a block diagram showing a configuration of an electronic device, according to an embodiment.

Referring to FIG. 2, an electronic device 100a may include a memory 210, a processor 220, a display 230, and a camera 240. However, the electronic device 100a may include more or fewer components than illustrated components, and is not limited to the above example.

Hereinafter, the above components will be described.

The memory 210 according to an embodiment may store a program for processing and control of the processor 220, and may store data input to or output from the electronic device 100a.

The memory 210 may include at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The memory 210 according to an embodiment may include a module including one or more instructions to determine a size of a wall surface to be photographed to be output to the image display apparatus 101, display, on a preview image, a guideline indicating a region corresponding to the size of the wall surface to be photographed, based on a distance between the electronic device 100a and the wall surface, capture an image indicating the wall surface based on the guideline, and transmitting the captured image to the image display apparatus 101 such that the captured image is output to the image display apparatus 101.

The processor 220 controls overall operations of the electronic device 100a. For example, the processor 220 may execute the one or more instructions stored in the memory 210 to control the display 230 and the camera 240 and perform functions of the electronic device 100a described with reference to FIGS. 1 through 16.

The processor 220 according to an embodiment may execute the one or more instructions to determine the size of the wall surface to be photographed to be output to the image display apparatus 101.

The processor 220 may determine the size of the wall surface to be photographed, based on a marker output to the image display apparatus 101 to indicate a distance between the electronic device 100a and the image display apparatus 101 and a photographing region. For example, the processor 220 may calculate a size of a region determined by the marker, based on the distance between the electronic device 100a and the image display apparatus 101.

Also, the processor 220 may receive, from the image display apparatus 101, information about a size of a screen of the image display apparatus 101 and determine the size of the wall surface to be photographed, based on the received information. For example, the processor 220 may determine a size corresponding to ½ of the screen of the image display apparatus 101 as the size of the wall surface to be photographed. Here, the processor 220 may receive information indicating that the screen of the image display apparatus 101 is 46 inch and verify a horizontal length and a vertical length of the screen of the image display apparatus 101, based on the received information. Alternatively, according to an embodiment, the processor 220 may receive, from the image display apparatus 101, information about the horizontal length and the vertical length of the screen of the image display apparatus 101.

When the horizontal length and the vertical length of the screen of the image display apparatus 101 are respectively A cm and B cm, the processor 220 may determine a horizontal length and a vertical length of the wall surface to be photographed respectively as (A/2) cm and B cm. Alternatively, according to an embodiment, the processor 220 may determine the horizontal length and the vertical length of the wall surface to be photographed respectively as A cm and (B/2) cm, but is not limited thereto.

The processor 220 according to an embodiment may execute the one or more instructions to control the display 230 to display, on the preview image, the guideline indicating the region corresponding to the size of the wall surface to be photographed, based on the distance between the electronic device 100a and the wall surface.

The processor 220 according to an embodiment may execute the one or more instructions to adjust and display the size of the guideline according to the distance between the electronic device 100a and the wall surface in response to movement of the electronic device 100a being detected. For example, in response to the movement of the electronic device 100a being detected, the processor 220 may calculate the distance between the electronic device 100a and the wall surface. As described above, the processor 220 may calculate the distance between the electronic device 100a and the wall surface by using at least one of the camera 240 and a sensor. For example, the sensor used to calculate the distance between the electronic device 100a and the wall surface may include at least one of an ultrasonic sensor and a gyro sensor, but is not limited thereto.

The processor 220 may adjust the size of the guideline based on the calculated distance between the electronic device 100a and the wall surface, and display the guideline of which the size is adjusted. For example, the processor 220 may adjust the size of the guideline to be larger in response to the distance between the electronic device 100a and the wall surface being decreased by the movement of the electronic device 100a. Also, the processor 220, in response to the distance between the electronic device 100a and the wall surface being increased by the movement of the electronic device 100a, may adjust the size of the guideline to be smaller.

Also, the processor 220 according to an embodiment may execute the one or more instructions to, in response to an external input of touching a certain region of the preview image, move the guideline to the touched region. For example, the processor 220 may display the guideline at a center region of the display 230 according to an initial setting. Here, the wall surface indicated by the displayed guideline may be a wall surface not suitable to be photographed to be output to the image display apparatus 101. For example, when an obstacle such as furniture, a pot, or a picture frame is included in the wall surface indicated by the guideline, the wall surface image captured by the camera 240 may be an image including the obstacle shown in the preview image. When the wall surface image including the obstacle is output to the image display apparatus 101, a sense of difference between the output wall surface image and an actual wall surface may be relatively large. Thus, the user may move a location of the guideline to a region indicating a wall surface suitable to be photographed in the preview image. For example, in response to the user input which is a touch input of a certain region on the preview image being detected, the processor 220 may move the location of the guideline to the touched region. Here, the touched region may be a region indicating a wall surface without an obstacle.

The processor 220 according to an embodiment may execute the one or more instructions to control the camera 240 to capture an image indicating the wall surface, based on the displayed guideline. A region required to be output to the image display apparatus 101 among the captured wall surface image may be a region indicated by the guideline. Accordingly, the processor 220 may extract the region indicated by the guideline from the captured wall surface image and store the extracted region.

Also, the processor 220 according to an embodiment may execute the one or more instructions to perform at least one of size correction, color correction, brightness correction, and distortion correction on the captured wall surface image. When the wall surface image is output to the image display apparatus 101, the processor 220 may correct the wall surface image to reduce the sense of difference with the actual wall surface. For example, when the wall surface image is not obtained by photographing the wall surface from the front, the captured wall surface image may display the distorted wall surface. Also, the captured wall surface image may be darker than the actual wall surface depending on the level of illumination of a photographed place. Accordingly, the processor 220 may perform at least one of size correction, color correction, brightness correction, and distortion correction on the captured wall surface image to minimize the sense of difference between the wall surface shown in the captured wall surface image and the actual wall surface. Also, according to an embodiment, the processor 220 may perform correction on the stored wall surface image by extracting the region indicated by the guideline from the captured wall surface image.

The processor 220 according to an embodiment may execute the one or more instructions to transmit the captured image to the image display apparatus 101 such that the captured image is output to the image display apparatus 101. The electronic device 100a and the image display apparatus 101 may be connected to each other via wireless communication. For example, the electronic device 100a and the image display apparatus 101 may be connected to each other via WiFi or Bluetooth, and the processor 220 may directly transmit the captured wall surface image to the image display apparatus 101 by using wireless communication. Accordingly, the image display apparatus 101 may output the received wall surface image to the screen of the image display apparatus 101.

Also, according to an embodiment, the processor 220 may transmit the captured wall surface image to the image display apparatus 101 via an external server. The processor 220 may transmit the captured wall surface image to the external server and the image display apparatus 101 may receive the captured wall surface image from the external server and output the captured wall surface image to the screen of the image display apparatus 101.

The display 230 may output the preview image of the camera 240 and display, on the preview image, the guideline indicating the region corresponding to the size of the wall surface to be photographed.

When the display 230 is configured as a touch screen, the display 230 may be used as an input device as well as an output device. For example, the display 230 may include at least one of a liquid crystal display, a thin-film transistor-liquid crystal display, an organic light-emitting diode, a flexible display, a 3-dimensional (3D) display, and an electrophoretic display.

The camera 240 may receive an image (for example, consecutive frames) corresponding to motion of the user including a gesture within a camera recognition range.

The camera 240 according to an embodiment may capture the image indicating the wall surface to be output to the image display apparatus 101.

Figure 3:
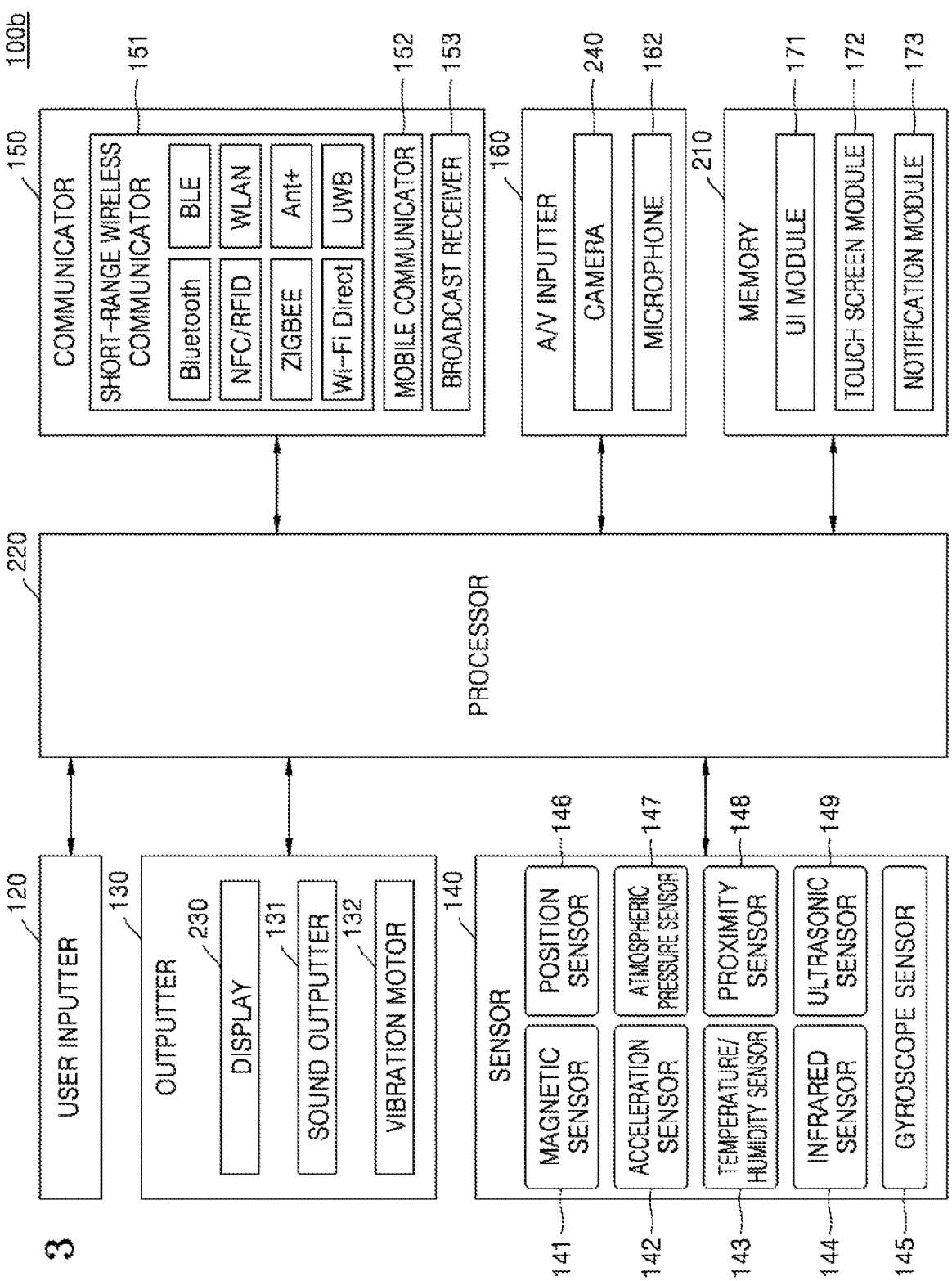
FIG. 3 is a block diagram showing a configuration of an electronic device, according to another embodiment.

FIG. 3 is a block diagram showing a configuration of an electronic device, according to another embodiment.

As shown in FIG. 3, an electronic device 100b may further include a user inputter 120, an outputter 130, a sensor 140, a communicator 150, and an audio/video (A/V) inputter 160 in addition to the memory 210, the processor 220, the display 230, and the camera 240.

Descriptions of the memory 210, processor 220, display 230, and camera 240, which are the same as those described with reference to FIG. 2, will not be provided in FIG. 3.

The user inputter 120 is a unit into which data for a user to control the electronic device 100b is input. For example, the user inputter 120 may include a key pad, a dome switch, a touch pad (contact capacitance type, pressure resistive type, an infrared (IR) detection type, surface ultrasonic wave conduction type, integral tension measuring type, piezo-effect type, or the like), a jog wheel, a jog switch, or the like, but is not limited thereto.

The user inputter 120 according to an embodiment may receive an input for moving a location of a guideline displayed on a preview image. For example, the input for moving the location of the guideline may include an input of touching a certain region of the preview image output to the display 230, but is not limited thereto.

The outputter 130 may output an audio signal, a video signal, or a vibration signal, and the outputter 130 may include the display 230, a sound outputter 131, and a vibration motor 132.

The display 230 displays information processed by the electronic device 100b. For example, the display 230 according to an embodiment may output the preview image received via the camera 240. Also, the display 230 may display, on the preview image, a guideline indicating a region corresponding to a size of a wall surface to be photographed to be output to the image display apparatus 101.

The sound outputter 131 outputs audio data received from the communicator 150 or stored in the memory 210. Also, the sound outputter 131 outputs a sound signal related to a function (for example, a call signal reception sound, a message reception sound, or a notification sound) performed by the electronic device 100b.

The processor 220 controls overall operations of the electronic device 100b and a signal flow between the electronic device 100b and internal components, and performs a function of processing data. When there is a user input or a pre-set and stored condition is satisfied, the processor 220 may execute an operation system (OS) and various applications stored in the memory 210.

The processor 220 according to an embodiment may perform one or more instructions stored in the memory 210 to determine a size of a wall surface to be photographed to be output to the image display apparatus 101, control the display 230 to display, on the preview image, the guideline indicating the region corresponding to the size of the wall surface to be photographed, based on a distance between the electronic device 100b and the wall surface, control the camera 240 to capture a wall surface image based on the output guideline, and transmit the captured image to the image display apparatus 101 such that the captured image is output to the image display apparatus 101.

The sensor 140 may detect a state of the electronic device 100b or a state around the electronic device 100b and transmit detected information to the processor 220.

The sensor 140 may include at least one of a magnetic sensor 141, an acceleration sensor 142, a temperature/humidity sensor 143, an infrared sensor 144, a gyroscope sensor 145, a position sensor 146 (for example, a global positioning system), an atmospheric pressure sensor 147, a proximity sensor 148, and an ultrasonic sensor 149 (도면에 RGB 센서로 표기), but is not limited thereto. Because functions of each sensor can be intuitively inferred by one of ordinary skill in the art from the name, detailed descriptions thereof will be omitted.

The communicator 150 may include one or more components enabling the electronic device 100b to communicate with another apparatus. The other device may be a computing device such as the electronic device 100b, or a sensing device, but is not limited thereto. For example, the communicator 150 may include a short-range wireless communicator 151, a mobile communicator 152, and a broadcast receiver 153.

The short-range wireless communicator 151 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra wideband (UWB) communicator, or an Ant+ communicator, but is not limited thereto.

The mobile communicator 152 may transmit or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver 153 may receive a broadcast signal and/or information related to a broadcast from an external source through a broadcast channel. The broadcast channel may include a satellite channel or a terrestrial channel. According to an implementation example, the electronic device 100b may not include the broadcast receiver 153.

The A/V inputter 160 is a unit into which an audio signal or a video signal is input, and may include a camera 240 and a microphone 162. The camera 240 may obtain an image frame such as a still image or moving image via an image sensor in an image call mode or photographing mode. An image captured via the image sensor may be processed via the processor 220 or a separate image processor (not shown).

The microphone 162 receives an external sound signal and processes the external sound signal to electric voice data. For example, the microphone 162 may receive a sound signal from an external device or a user. The microphone 162 may receive a voice input of a user. The microphone 162 may use various noise removal algorithms to remove noise generated while the external sound signal is received.

Programs stored in the memory 210 may be classified into a plurality of modules based on functions, and for example, may be classified into a user interface (UI) module 171, a touch screen module 172, and a notification module 173.

The UI module 171 may provide a specialized UI or graphics user interface (GUI), which interoperates with the electronic device 100b for each application. The touch screen module 172 may detect a touch gesture of the user on a touch screen and transmit information about the touch gesture to the processor 220. The touch screen module 172 according to an embodiment may recognize and analyze a touch code. The touch screen module 172 may be configured as separate hardware including a controller.

The notification module 173 may generate a signal for notifying event occurrence of the electronic device 100b. Examples of an event occurred in the electronic device 100b include call signal reception message reception, key signal input, and schedule notification. The notification module 173 may output a notification signal in a form of a video signal via the display 230, output a notification signal in a form of an audio signal via the sound outputter 131, or output a notification signal in a form of a vibration signal via the vibration motor 132.

Figure 4:
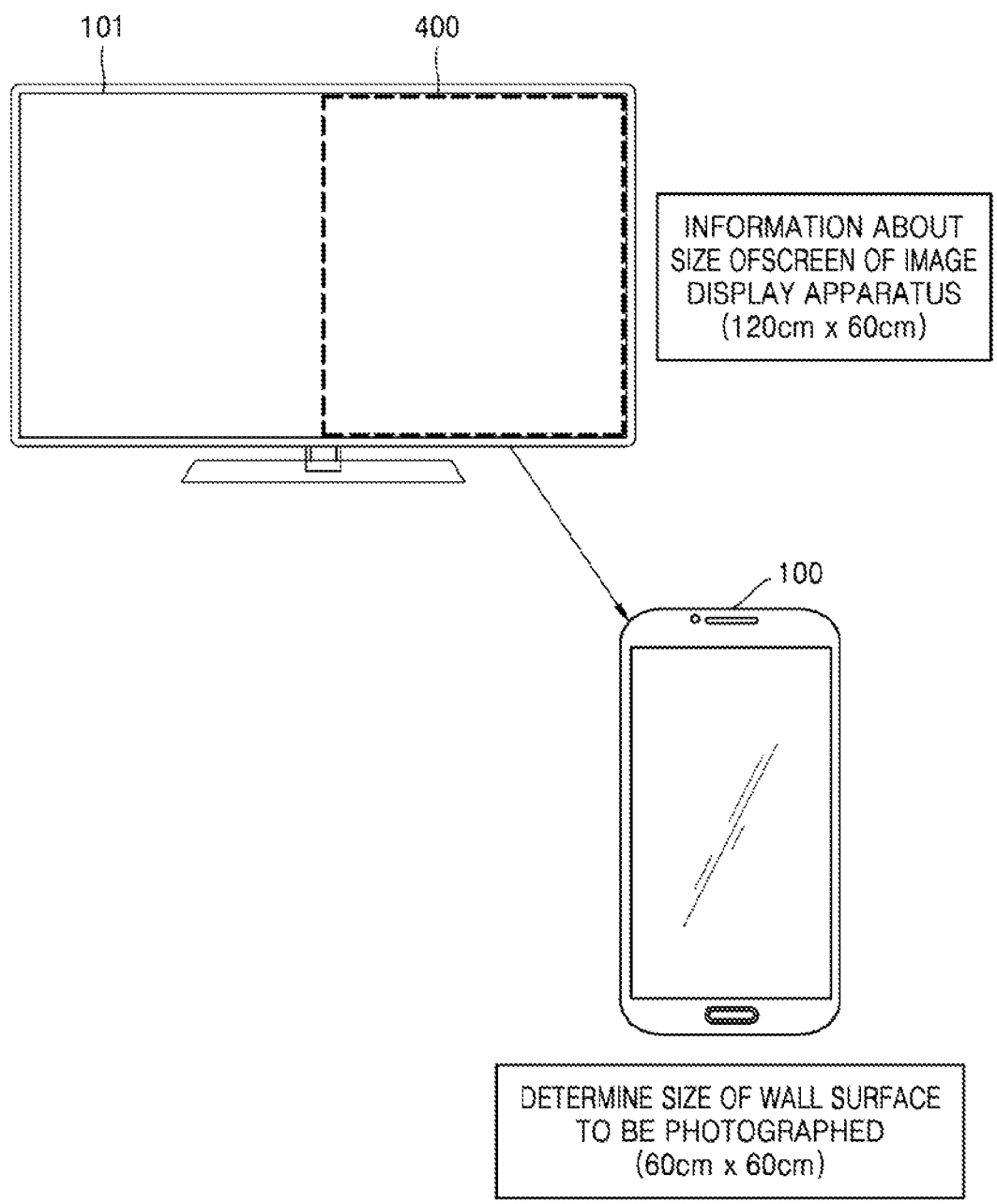
FIGS. 4 and 5 are diagrams showing examples of determining a size of a wall surface to be photographed by an electronic device, according to an embodiment.
Figure 5:
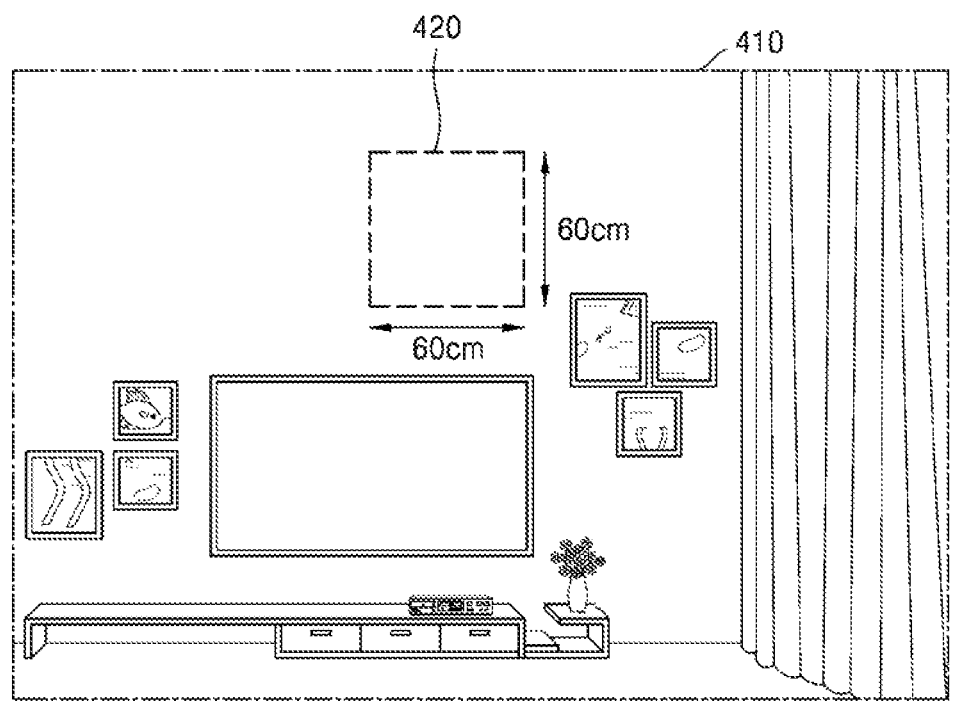
Figure 5:
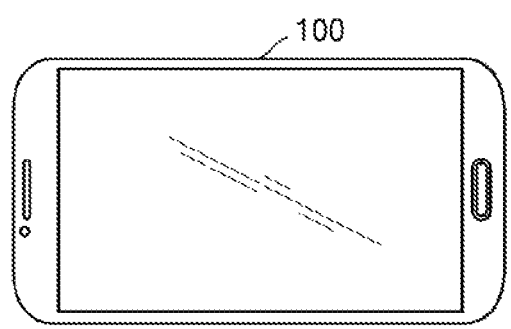

FIGS. 4 and 5 are diagrams showing examples of determining a size of a wall surface to be photographed by an electronic device, according to an embodiment.

The electronic device 100 according to an embodiment may determine a size of a wall surface to be photographed to be output to the image display apparatus 101. For example, the electronic device 100 may determine the size of the wall surface to be photographed based on a size of a screen of the image display apparatus 101.

Referring to FIG. 4, the electronic device 100 may receive, from the image display apparatus 101, information about the size of the screen of the image display apparatus 101. For example, when the electronic device 100 and the image display apparatus 101 are connected via wireless communication, the electronic device 100 may receive information about hardware specifications of the image display apparatus 101 (for example, a model name, the size of the screen, an aspect ratio of the screen, and horizontal/vertical lengths of the screen). For example, as shown in FIG. 4, the electronic device 100 may receive information indicating that the horizontal length and the vertical length of the screen of the image display apparatus 101 are respectively 120 cm and 60 cm. The electronic device 100 may determine the size of the wall surface to be photographed based on the size of the screen of the image display apparatus 101.

The electronic device 100 according to an embodiment may determine a size corresponding to ½ of the screen of the image display apparatus 101 as the size of the wall surface to be photographed. For example, the electronic device 100 may determine, as the size of the wall surface to be photographed, a size corresponding to a region obtained by vertically dividing or horizontally dividing the screen of the image display apparatus 101 in two. For example, as shown in FIG. 4, the electronic device 100 may determine a size (60 cm×60 cm) corresponding to a region 400 obtained by vertically dividing the screen of the image display apparatus 101 in two as the size of the wall surface to be photographed. Also, according to an embodiment, the electronic device 100 may determine a size corresponding to ⅓ of the screen of the image display apparatus 101 as the size of the wall surface to be photographed, but is not limited thereto.

When the electronic device 100 receives the information about the size of the screen of the image display apparatus 101 from the image display apparatus 101, the electronic device 100 may further quickly calculate the size of the wall surface to be photographed, based on the size of the screen of the image display apparatus 101. Referring to FIG. 5, when the size of the wall surface to be photographed is determined to be 60 cm×60 cm, the electronic device 100 may photograph a wall surface 420 corresponding to the determined size among an entire wall surface 410 and transmit a captured image to the image display apparatus 101.

Also, the electronic device 100 according to an embodiment may determine the size of the wall surface to be photographed, based on a marker output to the image display apparatus 101 to indicate a distance between the electronic device 100 and the image display apparatus 101 and a photographing region.

Figure 6:
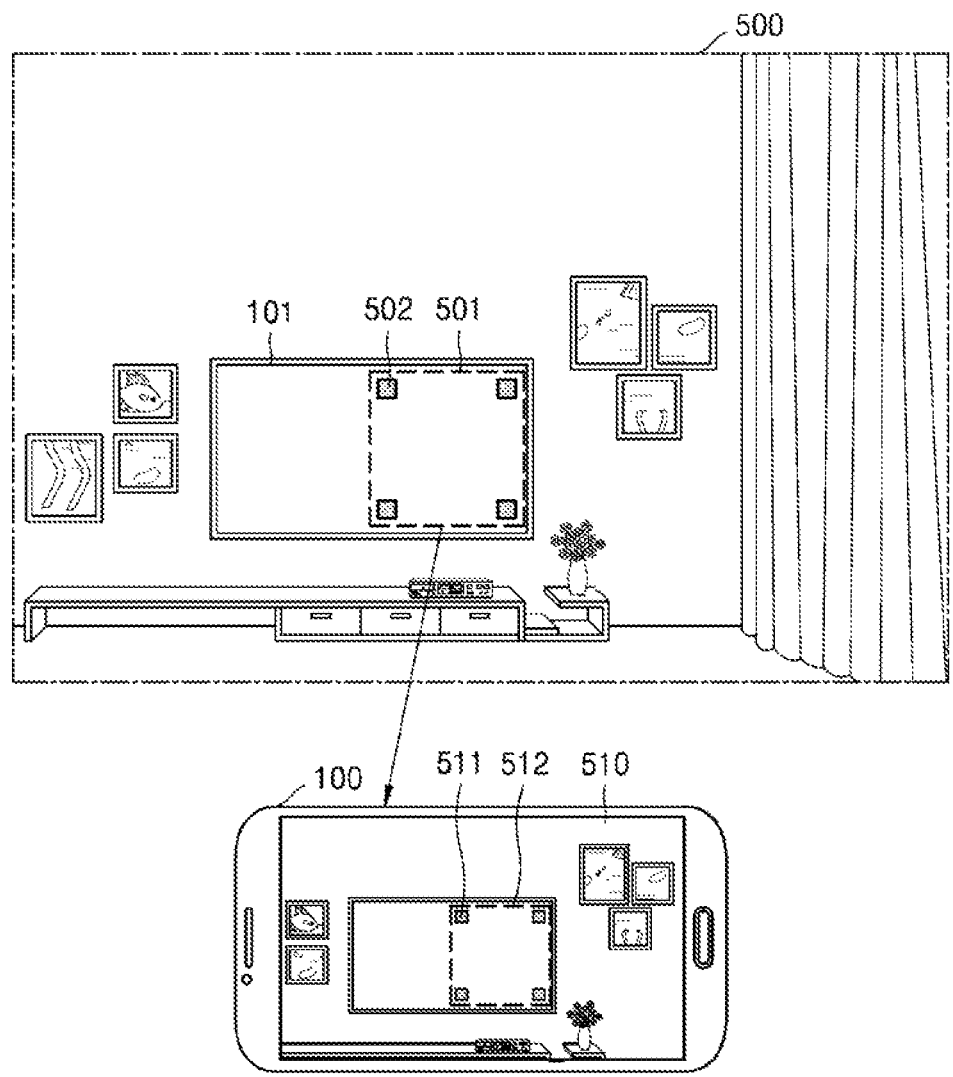
FIG. 6 is a diagram showing an example of determining a size of a wall surface to be photographed by an electronic device, according to an embodiment.

FIG. 6 is a diagram showing an example of determining a size of a wall surface to be photographed by an electronic device, according to an embodiment.

The electronic device 100 according to an embodiment may determine a size of a wall surface to be photographed, based on a marker output to the image display apparatus 101 to indicate a distance between the electronic device 100 and the image display apparatus 101 and a photographing region. For example, the electronic device 100 may calculate a size of a region determined by the marker, based on the distance between the electronic device 100 and the image display apparatus 101, and determine the size of the region determined by the marker as the size of the wall surface to be photographed.

Referring to FIG. 6, the image display apparatus 101 may output a marker 502 indicating a partial region of the screen of the image display apparatus 101. The marker 502 may be used to indicate the size of the wall surface to be photographed by the electronic device 100. For example, as shown in FIG. 6, the marker 502 may be in a form of dots indicating for corners of a rectangle, but is not limited thereto. For example, when the size of the wall surface to be photographed by the electronic device 100 is a size corresponding to ½ of the size of the screen of the image display apparatus 101, the marker 502 may be used to indicate a region corresponding to ½ of the screen of the image display apparatus 101. Here, as shown in FIG. 6, the marker 502 may indicate one region 501 among two regions obtained by vertically dividing the screen of the image display apparatus 101 in two. Also, according to an embodiment, the marker 502 may indicate one of two regions obtained by horizontally dividing the screen of the image display apparatus 101 in two, but is not limited thereto.

The electronic device 100 according to an embodiment may output a preview image 510 indicating a part of a wall surface 500 received via the camera 240.

Also, the electronic device 100 may calculate an actual size of a region 512 determined by a marker 511 indicated on the preview image 510, based on a distance between the electronic device 100 and the image display apparatus 101. For example, the electronic device 100 may measure the distance between the electronic device 100 and the image display apparatus 101 by using a distance sensor or may calculate the distance between the electronic device 100 and the image display apparatus 101 by using a lens formula using a lens focal length and a distance from a camera lens to an image, but an embodiment is not limited thereto. According to another embodiment, the electronic device 100 may calculate the actual size of the region 512 determined by the marker 511 by using the distance between the electronic device 100 and the image display apparatus 101, a height of a user photographing the wall surface by using the electronic device 100, and a trigonometric function.

Figure 7:
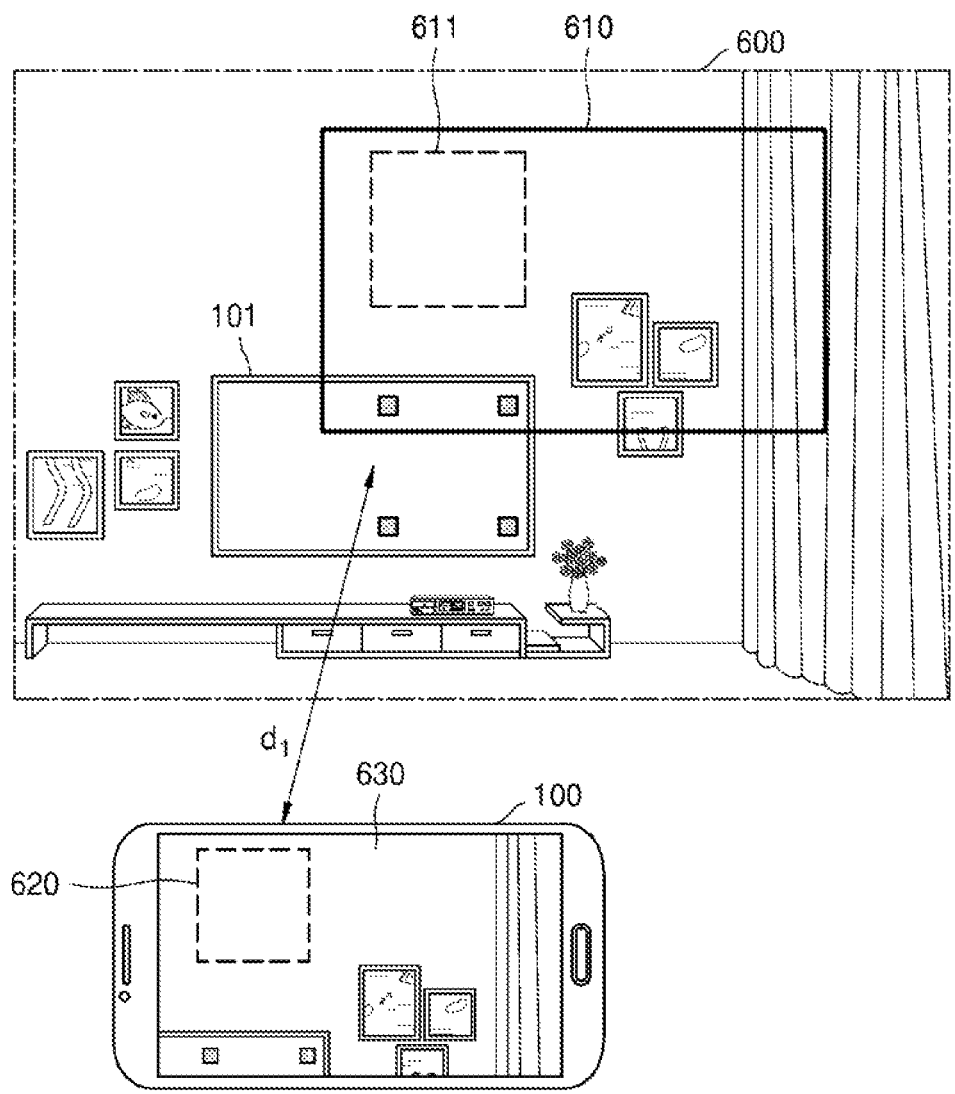
FIGS. 7 and 8 are diagrams showing examples of an electronic device displaying a guideline on a preview image, according to an embodiment.
Figure 8:
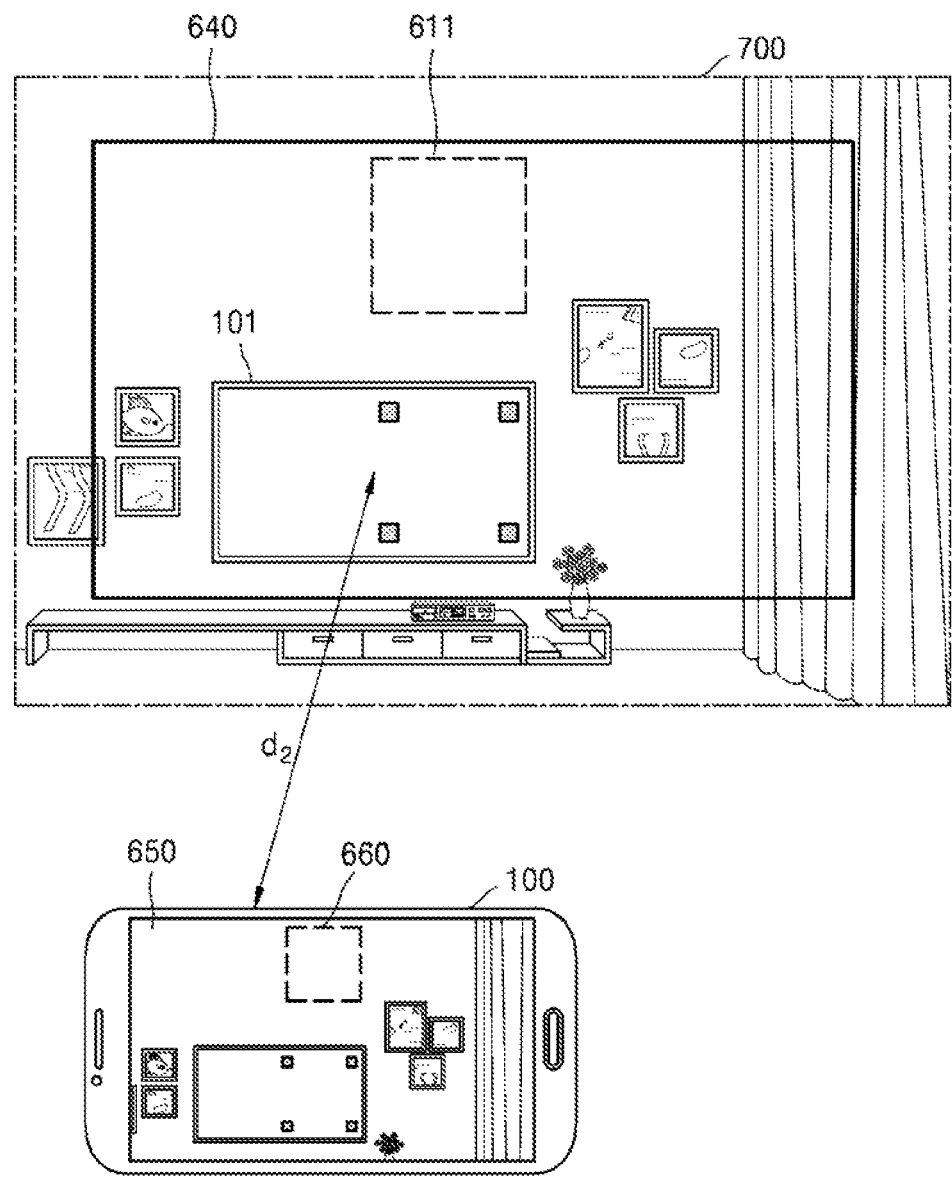

FIGS. 7 and 8 are diagrams showing examples of an electronic device displaying a guideline, according to an embodiment.

The electronic device 100 according to an embodiment may display, on a preview image, a guideline indicating a region corresponding to a size of a wall surface to be photographed, based on a distance between the electronic device 100 and the wall surface.

Thus, the size of the wall surface to be photographed by the electronic device 100 may be a fixed value (for example, 60 cm×60 cm), but a range of region indicated by a preview image 630 may vary depending on a distance between the electronic device 100 and a wall surface 600 to be photographed. Accordingly, the electronic device 100 may display a guideline 620 indicating a region corresponding to the size of the wall surface to be photographed on the preview image 630 to enable a user to easily capture a wall surface image to be output to the image display apparatus 101.

Referring to FIG. 7, the electronic device 100 may capture the wall surface image to be output to the image display apparatus 101 by using the camera 240. When the distance between the electronic device 100 and the wall surface 600 is $d_1$, the region indicated by the preview image 630 may be a partial region 610 of the wall surface 600. It is difficult for the user to determine the size of the wall surface to be photographed only from the preview image 630 output to the electronic device 100. Accordingly, the electronic device 100 may display, on the preview image 630, the guideline 620 indicating the region corresponding to the size of the wall surface to be photographed, based on the distance (for example, $d_1$) between the electronic device 100 and the wall surface 600.

For example, as shown in FIG. 7, when a size 611 of the wall surface to be photographed to be output to the image display apparatus 101 among the entire wall surface 600 is 60 cm×60 cm, the electronic device 100 may display, on the preview image 630, the guideline 620 indicating the region corresponding to the size 611 of the wall surface to be photographed.

The electronic device 100 according to an embodiment may adjust the size of the guideline 620 displayed on the preview image 630, based on the distance between the electronic device 100 and the wall surface 600. To minimize a sense of difference with an actual wall surface when the wall surface image is output to the image display apparatus 101, a user may photograph a wall surface that is not contaminated or damaged and that does not have an obstacle. Here, when the user moves to the wall surface to be photographed while holding the electronic device 100, the distance between the electronic device 100 and the wall surface 600 may become different. In response to movement of the electronic device 100 being detected, the electronic device 100 may calculate the distance between the electronic device 100 and the wall surface 600 and adjust the size of the guideline 620 displayed on the preview image 630, based on the calculated distance.

The electronic device 100 according to an embodiment may adjust the size of the guideline 620 to be larger in response to the distance between the electronic device 100 and the wall surface 600 being decreased by movement of the electronic device 100. Also, the electronic device 100 may adjust the size of the guideline 620 to be smaller in response to the distance between the electronic device 100 and the wall surface 600 being increased by the movement of the electronic device 100.

For example, referring to FIG. 8, even when the distance between the electronic device 100 and the wall surface 600 is changed, an actual range, i.e., the size 611, of the wall surface to be photographed by the electronic device 100 does not change. However, when the distance between the electronic device 100 and the wall surface 600 is changed from $d_1$ to $d_2$, a range of a region indicated by a preview image 650 may become different. For example, as shown in FIG. 8, when a value of $d_2$ is greater than $d_1$, the region indicated by the preview image 650 may be wider than the range of the region indicated by the preview image 630 of FIG. 7. Accordingly, the range of region corresponding to the size 611 of the wall surface to be photographed also varies in the preview images 630 and 650, and the sizes of guidelines 620 and 660 displayed on the preview images 630 and 650 also varies. The electronic device 100 adjusts the sizes of the guidelines 620 and 660 displayed on the preview images 630 and 650, based on the distance between the electronic device 100 and the wall surface 600, such that the user easily verifies the size 611 of the wall surface to be photographed on the preview images 630 and 650.

Figure 9:
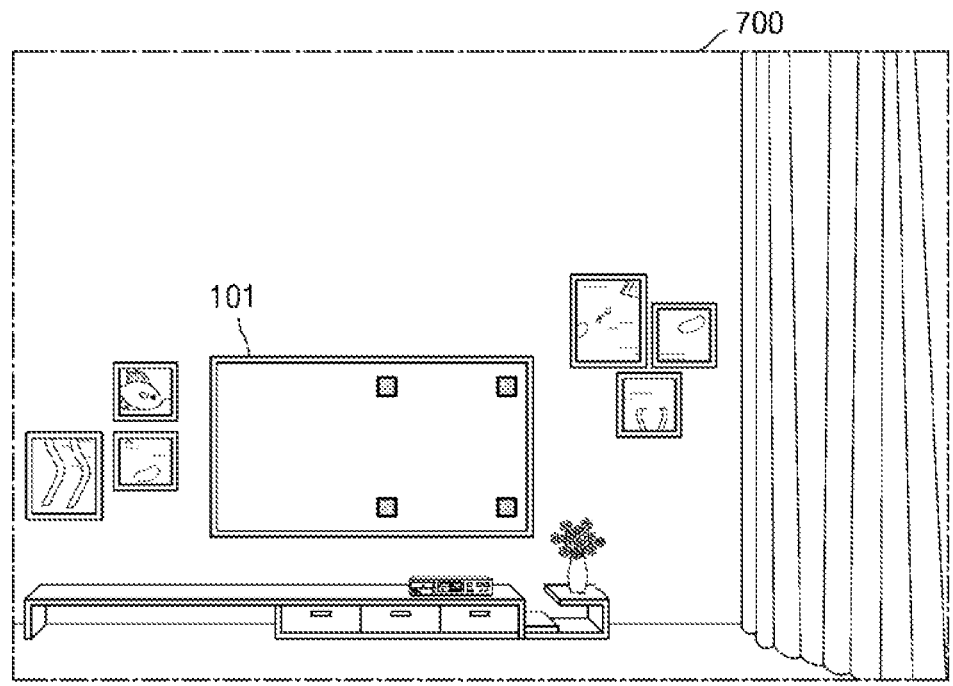
FIGS. 9 and 10 are diagrams showing examples of an electronic device moving a guideline according to a user input, according to an embodiment.
Figure 9:
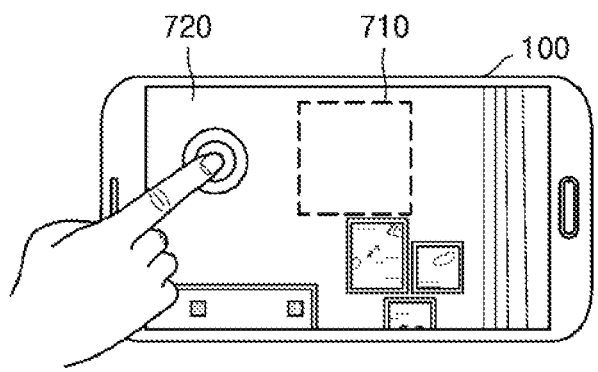
Figure 10:
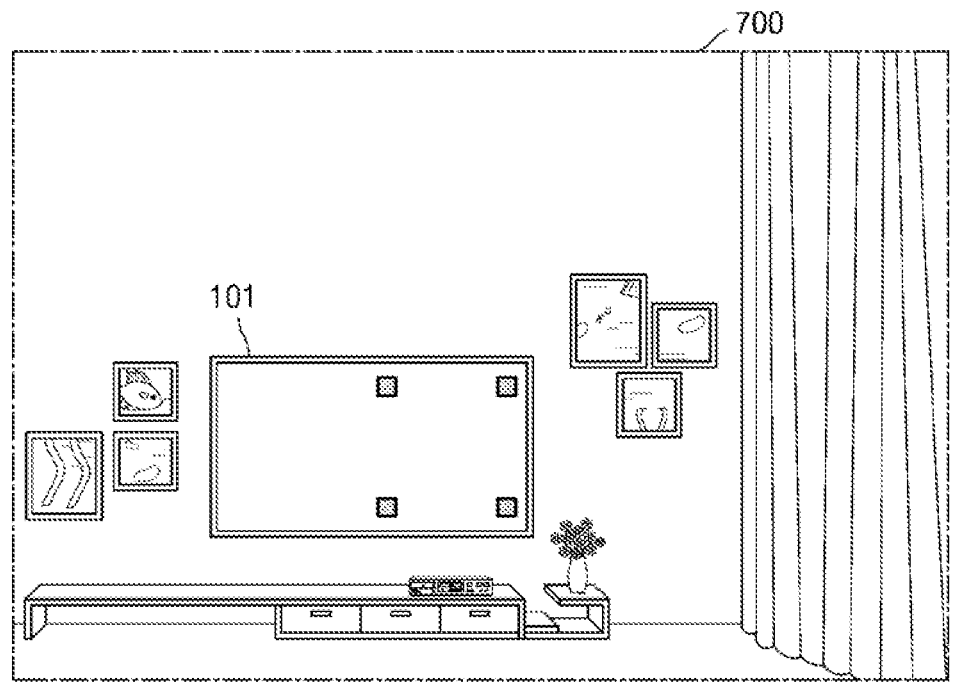
Figure 10:
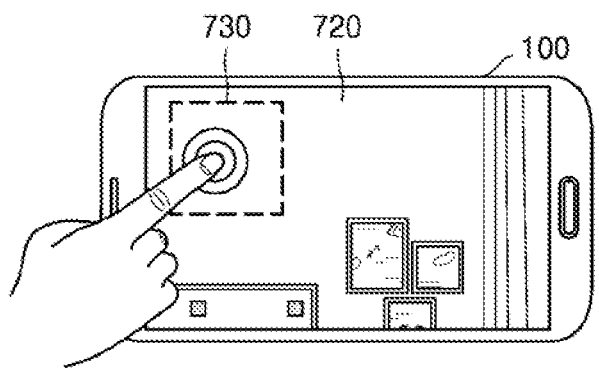

FIGS. 9 and 10 are diagrams showing examples of an electronic device moving a guideline according to a touch input, according to an embodiment.

The electronic device 100 according to an embodiment may move a guideline to a touched region in response to an external input of touching a certain region of a preview image.

Referring to FIG. 9, the electronic device 100 may display, on a center region of a preview image 720, a guideline 710 indicating a region corresponding to a size of a wall surface to be photographed. A location where the guideline 710 is displayed on the preview image 720 may be determined according to an internal setting of the electronic device 100 or may be changed according to a user's setting. However, as shown in FIG. 9, one or more obstacles (for example, a bookshelf and a picture frame) may be included in a region indicated by the guideline 710 in the preview image 720, and a wallpaper of the region indicated by the guideline 710 may be contaminated or damaged. In this case, when a wall surface image is output to the image display apparatus 101, a sense of difference between the output wall surface image and an actual wall surface 700 may be relatively large. Thus, the user may want to photograph a wall surface that is not contaminated or damaged and does not have an obstacle, and may touch a region to be photographed on the preview image 720 by using a finger to move the location of the guideline 710.

Referring to FIG. 10, the electronic device 100 may move a location of a guideline 730 from the center region of the preview image 720 to a touched region in response to an external input of touching an upper left region of the preview image 720.

Figure 11:
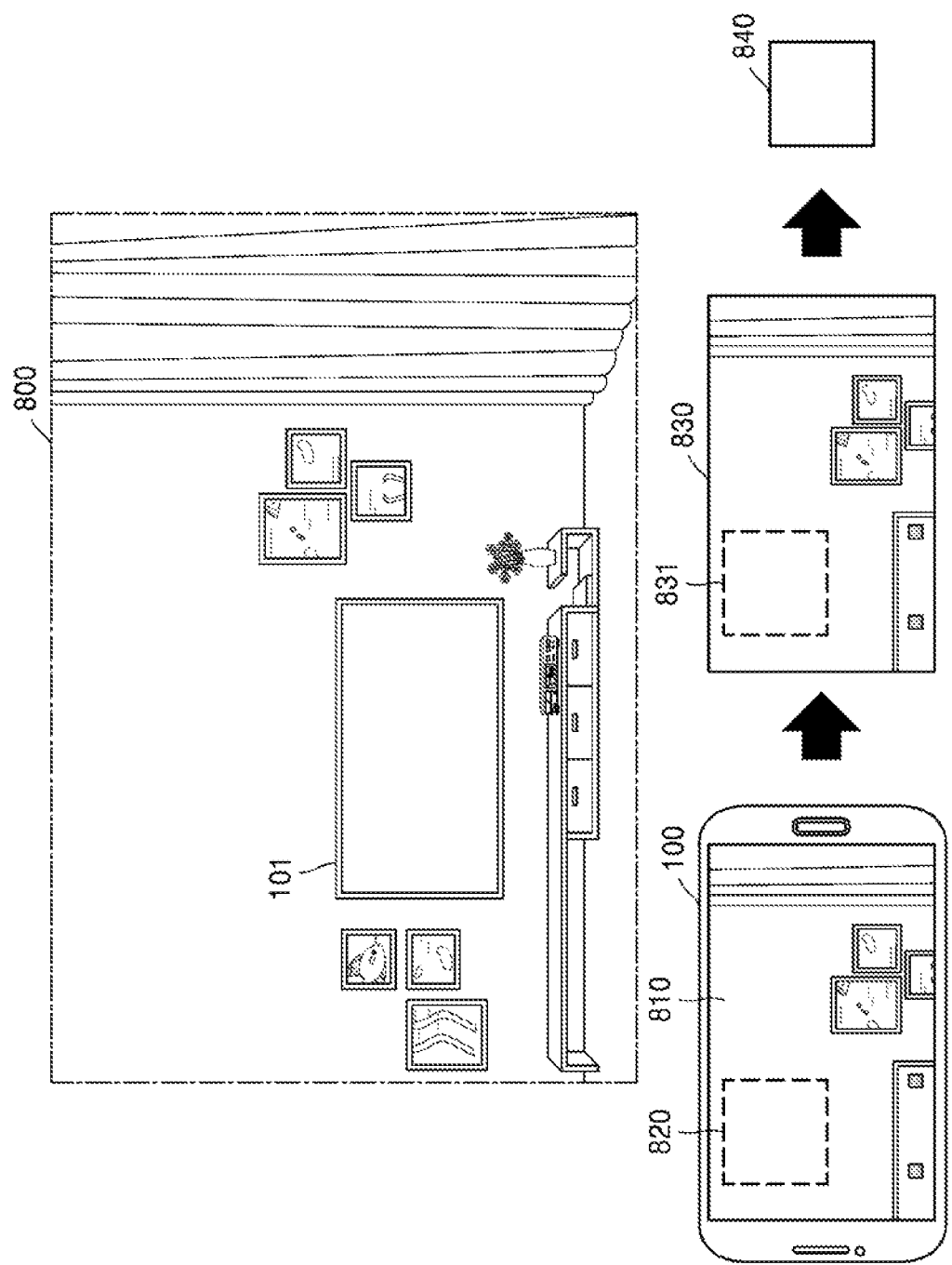
FIG. 11 is a diagram showing an example of an electronic device extracting a region indicated by a guideline from a captured image and storing the extracted region, according to an embodiment.

FIG. 11 is a diagram showing an example of an electronic device extracting and storing a captured image, according to an embodiment.

The electronic device 100 according to an embodiment may extract a region indicated by a guideline from a captured image and store the extracted region.

For example, referring to FIG. 11, the electronic device 100 may capture a wall surface image 830 in response to an external input of pressing or touching a photographing button. The wall surface image 830 may be an image identical to a preview image 810 and may include a region larger than a size of a wall surface to be photographed according to a distance between the electronic device 100 and a wall surface 800. However, because a region output to the image display apparatus 101 is a region indicated by a guideline 820, the electronic device 100 may extract a region indicated by a guideline 831 from the wall surface image 830 and store the extracted region. Then, the electronic device 100 may transmit a stored image 840 to the image display apparatus 101 such that the stored image 840 is output to the image display apparatus 101.

Figure 12:
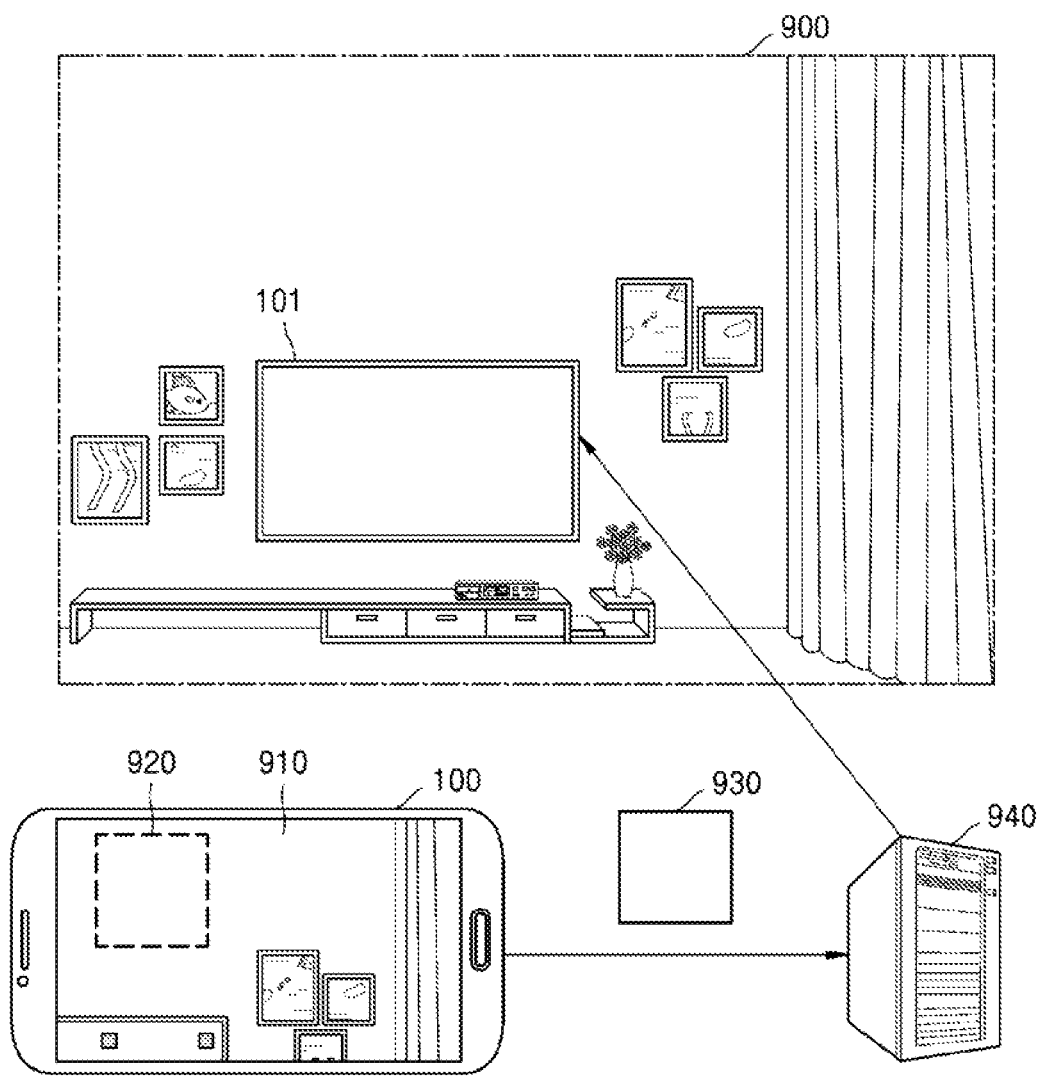
FIGS. 12 and 13 are diagrams showing examples of an electronic device transmitting a captured image to an image display apparatus, according to an embodiment.
Figure 13:
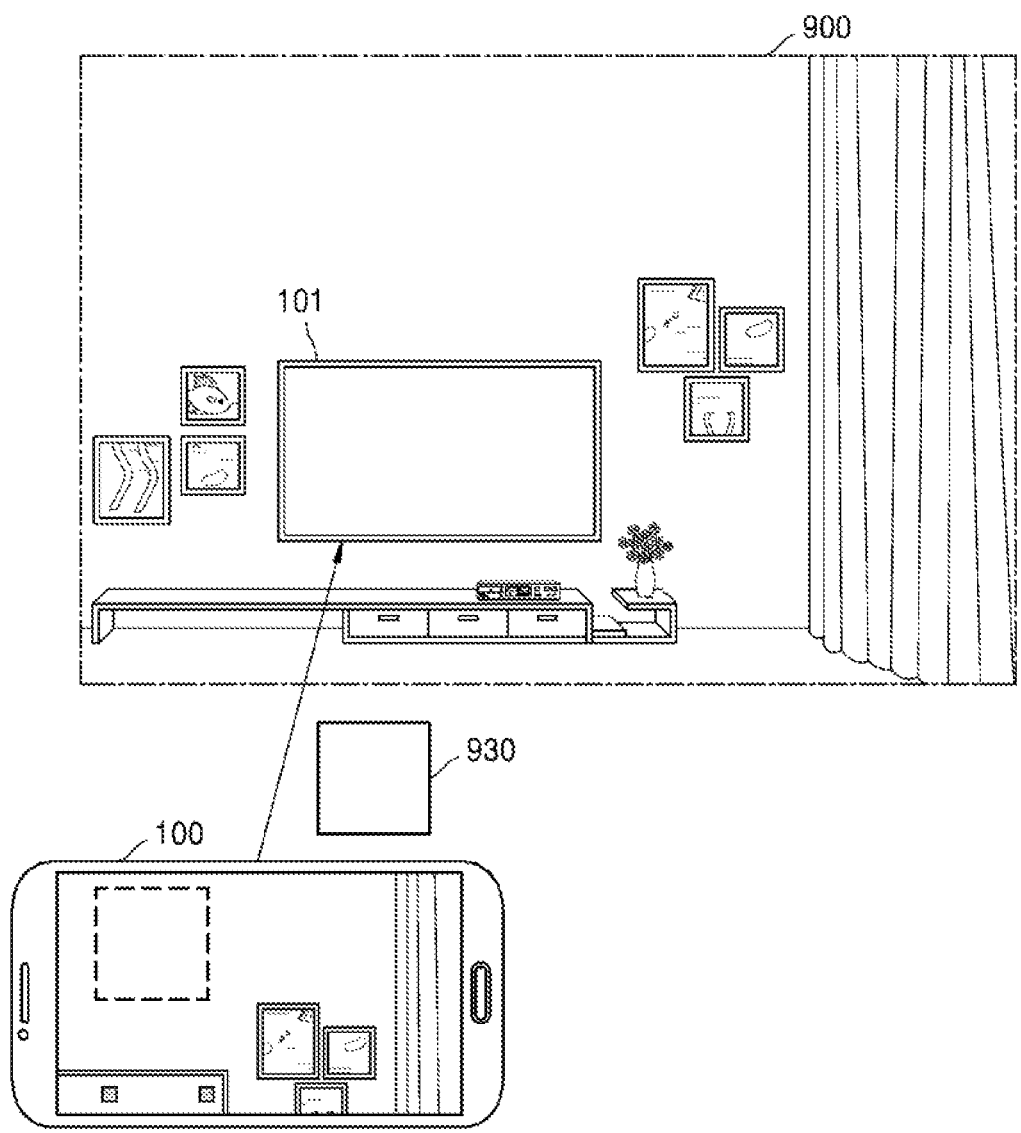

FIGS. 12 and 13 are diagrams showing examples of an electronic device transmitting a captured image to an image display apparatus, according to an embodiment.

The electronic device 100 according to an embodiment may transmit a captured image to the image display apparatus 101 such that the captured image is output to the image display apparatus 101.

For example, the electronic device 100 may transmit the captured image to the image display apparatus 101 via a server. Referring to FIG. 12, the electronic device 100 may extract a region indicated by a guideline 920 from a captured image and store the extracted region, and transmit a stored image 930 to a server 940. For example, the server 940 may include information about a plurality of home appliances located at home, and enable the electronic device 100 to easily control the plurality of home appliances located at home via the server 940. The image display apparatus 101 may receive the image 930 transmitted by the electronic device 100 from the server 940, and output the received image 930 on a screen of the image display apparatus 101.

According to another embodiment, the electronic device 100 may directly transmit a captured image to the image display apparatus 101 by using wireless communication.

Referring to FIG. 13, the electronic device 100 may be connected to the image display apparatus 101 via wireless communication such as Bluetooth or WiFi, but an embodiment is not limited thereto. When the electronic device 100 and the image display apparatus 101 are connected via wireless communication, the electronic device 100 may transmit the image 930 to the image display apparatus 101 via wireless communication. Here, the transmitted image 930 may be an image obtained by extracting a region indicated by a guideline from an image obtained by capturing a wall surface and storing the extracted region. Also, according to an embodiment, the transmitted image 930 may be an image obtained by performing at least one of size correction, color correction, brightness correction, and distortion correction on a captured image or an image obtained by extracting and storing a region indicated by a guideline.

Figure 14:
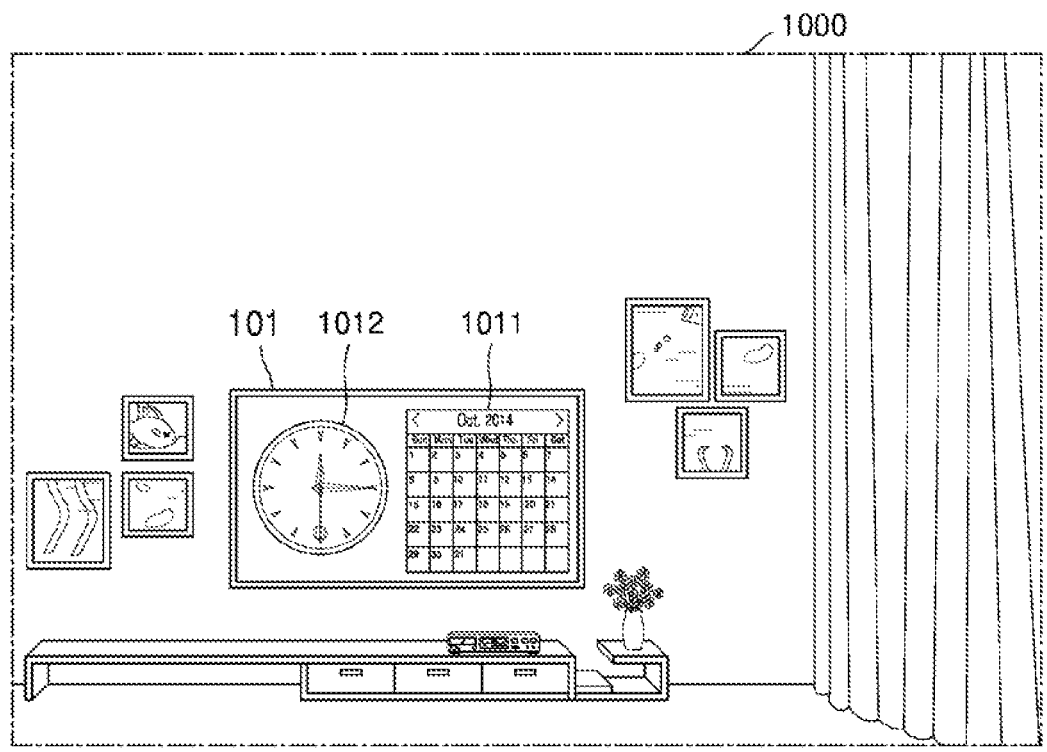
FIGS. 14 and 15 are diagrams showing examples of an image display apparatus outputting an image captured by an electronic device, according to an embodiment.
Figure 15:
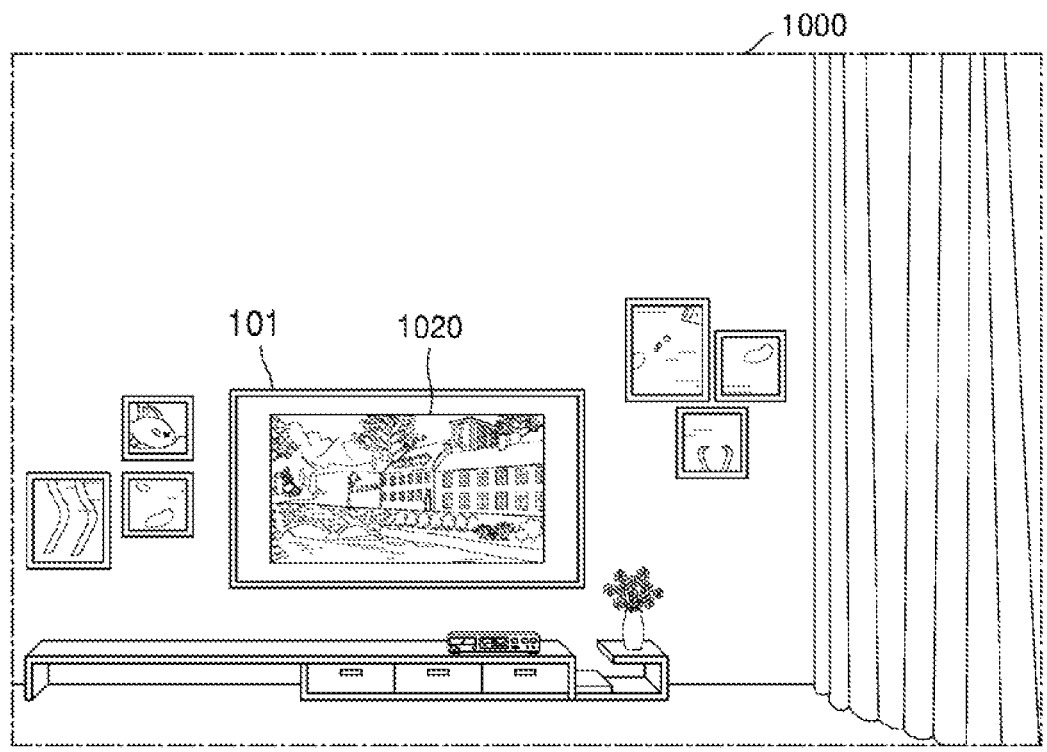

FIGS. 14 and 15 are diagrams showing examples of an image display apparatus outputting an image captured by an electronic device, according to an embodiment.

The image display apparatus 101 according to an embodiment may output a wall surface image captured by the electronic device 100. For example, referring to FIG. 14, the image display apparatus 101 may output a wall surface image as a background screen of the image display apparatus 101.

Also, the image display apparatus 101 may output the wall surface image as the background screen and output, on the background screen, an execution screen of an application or widget operable in the image display apparatus 101. For example, as shown in FIG. 14, the image display apparatus 101 may output the wall surface image as the background screen and output, on the background screen, an execution screen 1011 of a calendar application and an execution screen 1012 of a watch application.

Also, referring to FIG. 15, the image display apparatus 101 may output the wall surface image as the background screen and output, on the background screen, picture of a user or a painting 1020 preferred by the user. Accordingly, the user may use the image display apparatus 101 as a picture frame even when the user is not watching moving image content by using the image display apparatus 101.

Also, an image transmitted from the electronic device 100 according to an embodiment to the image display apparatus 101 may be an image obtained by extracting a region indicated by a guideline from an image obtained by capturing a wall surface and storing the extracted region or may be an image on which at least one of size correction, color correction, brightness correction, and distortion correction has been additionally performed. Here, the electronic device 100 may correct the captured image to be similar to a pattern, color, and size of pattern of a wall surface 1000 around the image display apparatus 101. Accordingly, the electronic device 100 may reduce a sense of difference between an image output as a background screen of the image display apparatus 101 and the actual wall surface 1000 around the image display apparatus 101.

Figure 16:
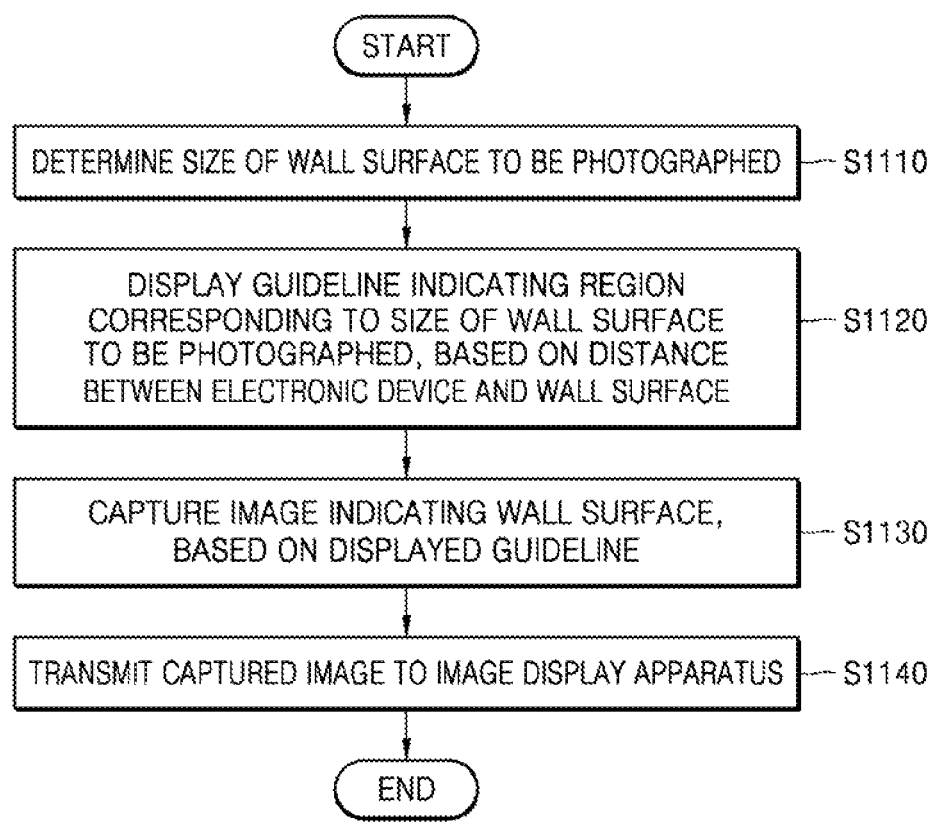
FIG. 16 is a flowchart of an operating method of an electronic device, according to an embodiment.

FIG. 16 is a flowchart of an operating method of an electronic device, according to an embodiment.

In operation S1110, the electronic device 100 determines a size of a wall surface to be photographed to be output to the image display apparatus 101.

The size of the wall surface to be photographed may be determined based on a marker output to the image display apparatus 101 to indicate a distance between the electronic device 100 and the image display apparatus 101 and a photographing region. For example, the electronic device 100 may calculate a size of a region determined by the marker, based on the distance between the electronic device 100 and the image display apparatus 101. Also, according to an embodiment, the electronic device 100 may receive, from the image display apparatus 101, information about a size of a screen of the image display apparatus 101 and determine the size of the wall surface to be photographed, based on the received information.

In operation S1120, the electronic device 100 may display, on a preview image, a guideline indicating a region corresponding to the size of the wall surface to be photographed, based on a distance between the electronic device 100 and the wall surface.

The electronic device 100 according to an embodiment may adjust and display a size of the guideline according to the distance between the electronic device 100 and the wall surface, in response to movement of the electronic device 100 being detected. For example, when the movement of the electronic device 100 is detected, the electronic device 100 may calculate the distance between the electronic device 100 and the wall surface. The electronic device 100 may adjust the size of the guideline based on the calculated distance between the electronic device 100 and the wall surface, and display the guideline of which the size is adjusted. For example, the electronic device 100 may adjust the size of the guideline to be larger when the distance between the electronic device 100 and the wall surface is decreased by the movement of the electronic device 100. Also, the electronic device 100 may adjust the size of the guideline to be smaller when the distance between the electronic device 100 and the wall surface is increased by the movement of the electronic device 100.

Also, the electronic device 100 according to an embodiment may move a guideline to a touched region in response to an external input of touching a certain region of the preview image.

In operation S1130, the electronic device 100 captures an image indicating the wall surface, based on the displayed guideline.

The electronic device 100 according to an embodiment may extract a region indicated by the guideline from the captured image and store the extracted region. Also, the electronic device 100 may perform at least one of size correction, color correction, brightness correction, and distortion correction on the captured image or the image obtained by extracting the region indicated by the guideline from the captured image and storing the extracted region.

In operation S1140, the electronic device 100 may transmit the captured image to the image display apparatus 101 such that the captured image is output to the image display apparatus 101.

The electronic device 100 according to an embodiment may transmit the captured image to the image display apparatus 101 via an external server. Also, according to an embodiment, the electronic device 100 may be connected to the image display apparatus 101 via wireless communication such as WiFi or Bluetooth, and directly transmit the captured image to the image display apparatus 101 via the wireless communication.

Some embodiment may also be realized in a form of a recording medium including instructions executable by a computer, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium.

Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable instruction, a data structure, a program module, other data of a modulated data signal, or another transmission mechanism, and an example thereof includes an arbitrary information transmission medium.

Furthermore, in the specification, the term "unit" may be a hardware component such as a processor or circuit and/or a software component that is executed by a hardware component such as a processor.

The above description of the disclosure is provided for illustration, and it will be understood by those of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

The scope of the disclosure is defined by the appended claims rather than the detailed description, and all changes or modifications within the scope of the appended claims and their equivalents will be construed as being included in the scope of the disclosure.

The invention claimed is:

1. An electronic device comprising:
   a camera;
   a display;
   a memory storing one or more instructions; and
   a processor configured to execute the one or more instructions stored in the memory to:
   obtain information about a size of a region that is determined by at least one marker displayed on a screen of an image display apparatus, based on a distance between the electronic device and the image display apparatus, wherein the region is included in the screen of the image display apparatus;
   based on the obtained information, determine a size of a wall surface to be photographed;
   control the display to display, on a preview image, a guideline indicating a region corresponding to the size of the wall surface to be photographed, based on the distance between the electronic device and the wall surface;
   control the camera to capture an image of the wall surface corresponding to an area indicated by the guideline; and
   transmit the captured image to the image display apparatus such that the captured image is output to the image display apparatus.

2. The electronic device of claim 1, wherein the processor is further configured to execute the one or more instructions to:
   determine the size of the region determined by the at least one marker as the size of the wall surface to be photographed.

3. The electronic device of claim 1, wherein the processor is further configured to execute the one or more instructions to:

based on movement of the electronic device being detected, calculate the distance between the electronic device and the wall surface;

adjust a size of the guideline, based on the calculated distance between the electronic device and the wall surface; and control the display to display, on the preview image, the guideline of which the size is adjusted.

4. The electronic device of claim 3, wherein the processor is further configured to execute the one or more instructions to:

based on the distance between the electronic device and the wall surface being decreased due to the movement of the electronic device, adjust the size of the guideline to be larger; and based on the distance between the electronic device and the wall surface being increased due to the movement of the electronic device adjust the size of the guideline to be smaller.

5. The electronic device of claim 1, wherein the processor is further configured to execute the one or more instructions to:

perform at least one of size correction, color correction, brightness correction, or distortion correction on the captured image; and transmit the corrected image to the image display apparatus such that the corrected image is output to the image display apparatus.

6. The electronic device of claim 1, wherein the processor is further configured to execute the one or more instructions to, based on an external input of selecting a region of the preview image, move the guideline to the selected region.

7. The electronic device of claim 1, wherein the processor is further configured to execute the one or more instructions to:

extract a region indicated by the guideline from the captured image and store the extracted region; and transmit the stored image to the image display apparatus such that the stored image is output to the image display apparatus.

8. The electronic device of claim 1, wherein the processor is further configured to execute the one or more instructions to calculate the distance between the electronic device and the wall surface based on at least one of an ultrasonic sensor or a gyro sensor.

9. An operating method of an electronic device, the operating method comprising:

obtaining information about a size of a region that is determined by at least one of marker displayed on a screen of an image display apparatus, based on a distance between the electronic device and the image display apparatus, wherein the region is included in the screen of the image display apparatus;

based on the obtained information, determining a size of a wall surface to be photographed to be output to the image display apparatus;

displaying, on a preview image, a guideline indicating a region corresponding to the size of the wall surface to be photographed, based on the distance between the electronic device and the wall surface;

capturing an image of the wall surface corresponding to an area indicated by the guideline; and transmitting the captured image to the image display apparatus such that the captured image is output to the image display apparatus.

10. The operating method of claim 9, wherein the displaying of the guideline comprises:

based on movement of the electronic device being detected calculating the distance between the electronic device and the wall surface;

adjusting a size of the guideline, based on the calculated distance between the electronic device and the wall surface; and displaying the guideline of which the size is adjusted on the preview image.

11. A non-transitory computer-readable recording medium having recorded thereon a program for executing the operating method of claim 9.

12. An electronic device comprising:

a camera;

a display;

a memory storing one or more instructions; and a processor configured to execute the one or more instructions stored in the memory to:

obtain information about a size of a screen of an image display apparatus from the image display apparatus;

based on the information, determine a size of a wall surface to be photographed to be output by the image display apparatus;

control the display to display, on a preview image, a guideline indicating a region corresponding to the size of the wall surface to be photographed, based on a distance between the electronic device and the wall surface, wherein a size of the guideline is adjusted such that the size of the guideline is increased in response to the distance between the electronic device and the wall surface being decreased;

control the camera to capture an image of the wall surface corresponding to an area indicated by the guideline; and transmit the captured image to the image display apparatus such that the captured image is output to the image display apparatus.

13. The electronic device of claim 12, wherein the processor is further configured to execute the one or more instructions to:

based on the distance between the electronic device and the wall surface being increased due to a movement of the electronic device, adjust the size of the guideline to be smaller.

14. The electronic device of claim 12, wherein the processor is further configured to execute the one or more instructions to, based on an external input of selecting a region of the preview image, move the guideline to the selected region.

15. The electronic device of claim 12, wherein the processor is further configured to execute the one or more instructions to:

extract a region indicated by the guideline from the captured image and store the extracted region; and transmit the stored image to the image display apparatus such that the stored image is output by the image display apparatus.

* * * * *